Patented Oct. 31, 1922.

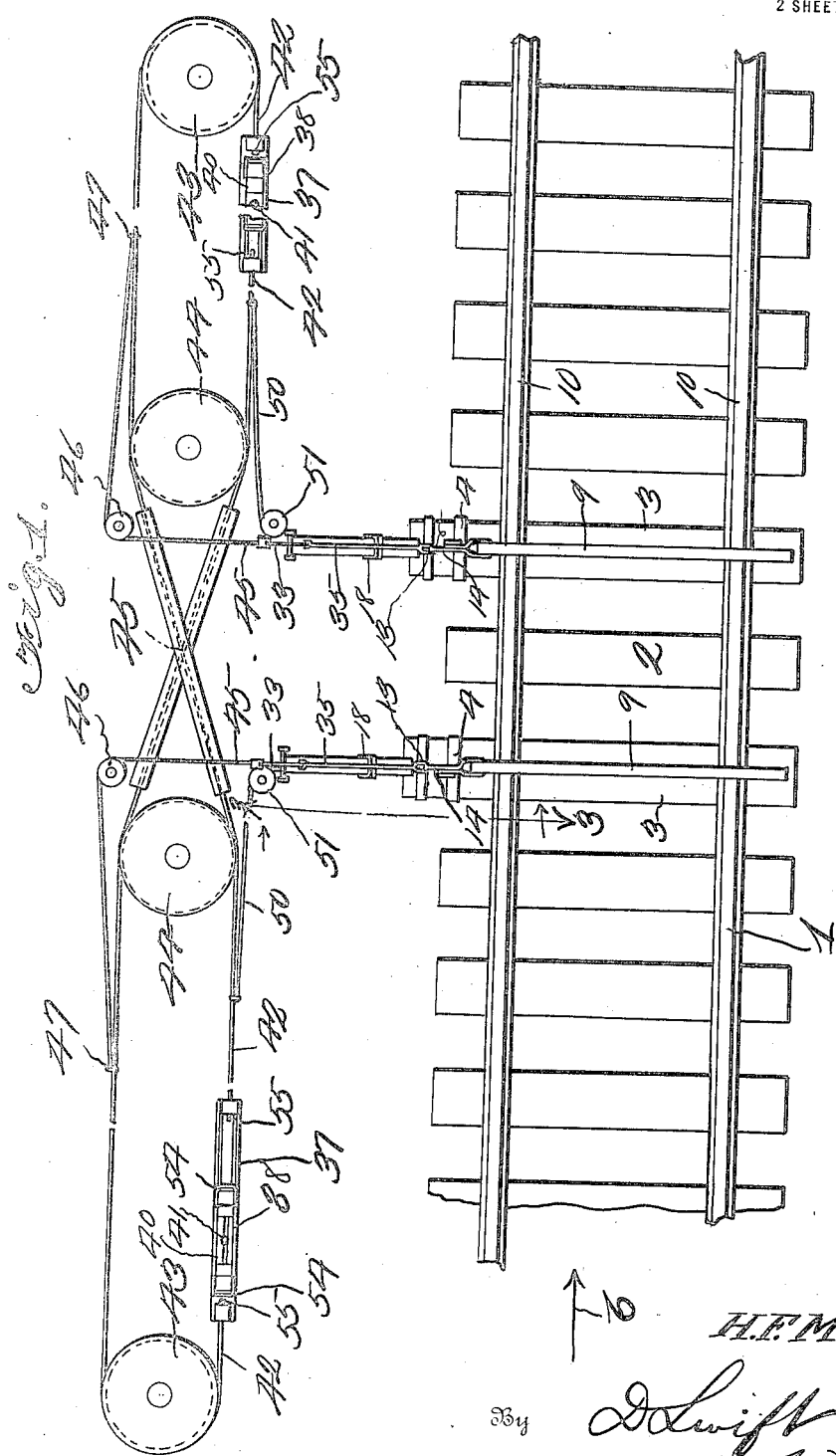

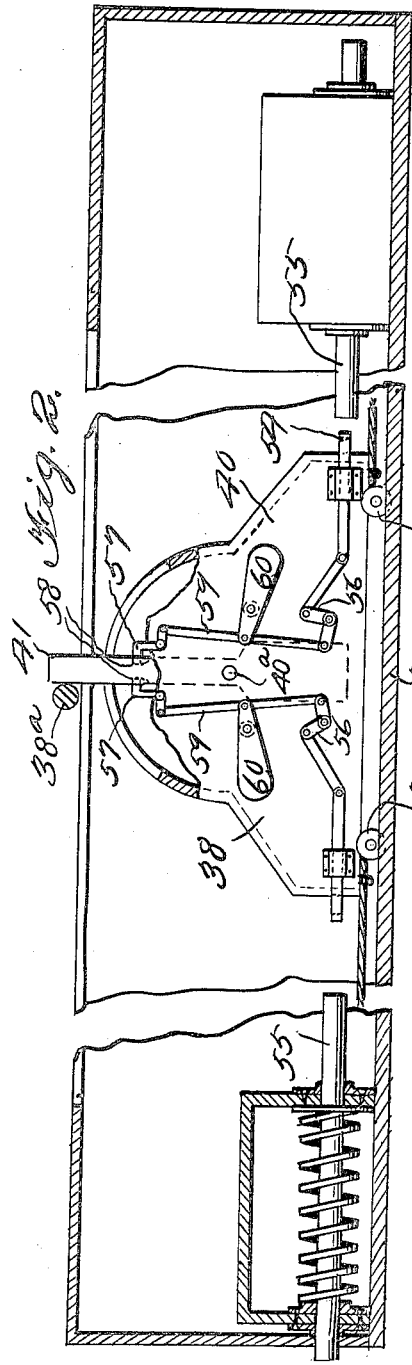

1,433,898

UNITED STATES PATENT OFFICE.

HENRY FRANKLIN McLEY, OF PATTONSBURG, MISSOURI.

CATTLE GUARD.

Application filed October 6, 1921. Serial No. 505,839.

*To all whom it may concern:*

Be it known that I, HENRY FRANKLIN McLEY, a citizen of the United States, residing at Pattonsburg, in the county of Daviess, State of Missouri, have invented a new and useful Cattle Guard; and I do hereby declare the following to be a full, clear, and exact description of the invention, such as will enable others skilled in the art to which it appertains to make and use the same.

The invention relates to cattle guards and has for its object to provide transversely disposed spaced gates adapted to be placed at each side of a railroad crossing and so constructed and controlled that when a train is going in either direction, said gates will be simultaneously raised, and after the train has passed the crossing said gates will be simultaneously lowered for barring access up and down the track.

A further object is to provide a gate actuating mechanism for swinging to a substantially vertical position a gate pivoted adjacent the side of a railroad track, said mechanism comprising a pivoted upwardly extending bar disposed to the rear of the pivotal point of the gate and having its upper end connected to the gate by means of a link. Also to provide a downwardly and rearwardly extending bar having its upper end pivotally connected to the upper end of the vertically disposed pivoted member, and having its lower end terminating in a bifurcation which arches a guide member having a slot in its lower side. Disposed within its guide member is a longitudinally movable bar, to which the arms of the bifurcation are pivoted, and to provide train actuated cable means for moving the bar within the guide longitudinally for raising and lowering the pivoted gate.

A further object is to provide in connection with the gate and its operating mechanism semaphore arms, which arms are actuated to substantially horizontal positions when the gate is lowered and to substantially vertical positions when the gate is in raised position.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 1 is a top plan view of the cattle guard showing the same in normal position.

Figure 2 is a longitudinal sectional view through a casing located adjacent the track and showing partially in elevation and partially in section the cattle gate actuating mechanism.

Figure 3 is a transverse vertical sectional view.

Referring to the drawings, the numeral 1 designates a railroad track and 2 a road crossing. Secured to cross ties 3 at each side of the crossing 2 are upwardly extending brackets 4, to the upper ends of which are pivoted at 5 gate carrying brackets 6. The brackets 6 are provided with diverging arms 7 which are secured at 8 to the gates 9, which gates extend across the track 2 and normally rest on the rails 10 and prevent cattle from turning up or down the track 1 thereby obviating the danger incident to a train hitting an animal and at the same time reducing claims for damages against railroads for cattle to a minimum, which cattle have been killed on the railroad.

Extending upwardly from the crossties 3 adjacent their rear ends and outwardly disposed in relation to the brackets 4 are substantially vertically disposed bars 11. The lower ends of the bars 11 are pivotally connected as at 12 while their upper ends are pivotally connected at 13 to links 14 which extend downwardly in the direction of the railroad 1 and have their ends pivotally connected at 15 to the gates 9 at points substantially in alignment horizontally with the pivotal points 5, thereby so positioning the pivotal points 15 in relation to the pivotal points 5 that when the links 14 are moved in the direction of arrow *a*, the gates will be pivoted upwardly on their pivotal point for allowing a train to pass, said gates being actuated by the train through the medium of mechanism hereinafter set forth. Also pivotally connected at 13 are downwardly and rearwardly extending connecting bars 16, the lower ends of which terminate in bifurcations 17, the arms of which are designated by the numeral 18, and one of said arms is disposed on each side of a transversely and horizontally disposed guide casing 19. Disposed in the guide casings 19 are guides 20, to which guides the arms 18 of the links 16 are pivotally connected at 21. It will be seen that when the guides 20 are moved longitudinally in the casings 19 the links 14 will be moved in directions whereby the gates will be simultaneously raised or lowered.

Disposed adjacent each gate is a signal post 22, which signal posts have pivoted thereto at 23 semaphore signals 24, which signals when the gates are in horizontal position are horizontally disposed, and when the gates are in raised positions are substantially vertically disposed, said semaphores being actuated through the medium of connecting rods 25, one end of which is pivotally connected as at 26 to an arm 27 of each semaphore and the other end pivotally connected at 28 to an arm 29 of each bracket 6. If so desired an electric signal 30 may be placed on the signal posts 22 and serving as means for illuminating the semaphore arm 24 as a signal itself. The casings 19 are supported by spaced posts 31, one of said posts at each side of the crossing forming a signal post, to which posts are pivotally connected at 32 semaphores 33, to the arms 34 of which connecting rods 35 are pivotally connected at 36. The connecting rods 35 have their other ends pivoted at 13, therefore it will be seen that when the gates 9 are in lowered positions, the semaphores 33 will be disposed substantially horizontally as shown in Figure 3, however when the gates are opened, that is in a raised position the semaphores will be lowered thereby signalling approaching trains or approaching persons that the gates have been raised by an approaching train. When semaphores 24 and 33 are in normal position as shown in Figure 3, they will indicate to persons approaching that cattle guards are down and that a train has not operated the gates.

Disposed on each side of the crossing 2 and preferably at points remote from said crossing are tracks 37, which are parallel to the railroad track 1 and have mounted thereon travelers 38, which travelers are supported on wheels 39 and are adapted to be moved by a projecting member carried by the train. Each traveler 38 comprises a casing 40 having pivoted therein at 40ª a vertically disposed weighted pivoted lever 41 adapted to be engaged by a retractible projection 38ª carried by the train for moving the traveler 38 in parallel relation to the track. The travelers 38 have connected to their ends cables 42, which cables extend over pulleys 43 and over guide pulleys 44 and are crossed at 45. It will be seen that when the projection 38ª carried by a train engages the pivoted member 41, said travelers 38 will be moved inwardly towards each other, thereby imparting simultaneous outward pulls on the cables 45. The cables 45 extend over pulleys 46 and are connected to the cables 42 as at 47, thus it will be seen that the cables 45 which are connected at 48 to guide members 20 when simultaneously pulled outwardly will simultaneously raise the gates 9. The gates 9 will be held in open position by passing beyond a vertical position and limited in their outward movement by the connecting rods 25. During the outward pull on the cables 45, the cables 50 will move inwardly toward each other, and as said cables pass over pulleys 51 and 52 and have their ends secured as at 53 to the forward ends of the guides 20, sufficient slack will be supplied for allowing movement of the guides 20. As the train continues in the direction of the arrow b, the traveler 38 will be moved in the same direction. When the traveler 38 reaches the end of its movement it is automatically released by means of the U-shaped member 54 which comes into engagement with one of the spring actuated bumpers 55, thereby rocking the bell crank lever 56, and moving the pivoted bell crank 57 out of cooperative engagement with the notch 58 in the lever 41 through the medium of the connecting rod 59, said connecting rod 59 being normally forced upwardly by means of the pivoted weights 60. It will be seen that when the U-shaped member 54 is forced into engagement with the spring actuated bumper 55, that the lever 41 will be released, thereby allowing the weighted lever 41 to tilt sufficiently for the member 38ª carried by the train to pass. After the train has passed the crossing the projections 38ª come into engagement with the weighted lever 41 carried by the traveler 38 on the opposite side of the crossing and moves said traveler in a direction away from the crossing until the weighted lever 41 is released for allowing the projections 38ª to pass. This operation restores the gates to their normal positions across the tracks. The weighted levers 41 are normally maintained in vertical position by their lower weighted ends, therefore they normally return after each operation through the medium of gravity. It will be seen that the travelers 38 are provided with reversely positioned lever tripping mechanism and that the same numerals apply thereto. This duplication of mechanism forms means whereby the gates may be operated by a train traveling in the opposite direction to that described above.

From the above it will be seen that a train operated cattle guard for railroad is provided which is simple in operation and one wherein the operation is positive and the gates will be operated no matter which way the trains are traveling.

The invention having been set forth what is claimed as new and useful is:—

1. A cattle guard comprising spaced gates, said gates having one of their ends pivotally mounted to one side of a railroad track, a link having one of its ends pivoted to the gate adjacent its pivotal point, said link extending upwardly and outwardly, a vertically disposed pivoted bar having its upper end pivotally connected to the rear end of the upwardly and outwardly extending link, a horizontally disposed guide located rearwardly of the vertically disposed pivoted bar, a guide member slidably mounted in said guide, a downwardly and outwardly extending bar having its upper end pivotally connected to the upper end of the vertically disposed pivoted bar and its lower end pivotally connected to the guide member, and cable means actuated by a train for moving said guide for raising and lowering said gates.

2. The combination with a pair of spaced cattle guard gates pivoted to swing in a vertical plane and having their pivotal points disposed to one side of a railroad track, of a train actuated operating mechanism for raising and lowering said gates, said mechanism comprising travelers disposed to each side of the gates, crossed cable connections between the travelers and the gates and forming means in connection with aligned cables for raising the gates when the traveler is moved by a train, cables for returning said gates to normal position when the train has passed the gates and engage the traveler, levers carried by the travelers and adapted to be engaged by a projection carried by the train and a tripping mechanism for releasing said levers at the end of the gate actuating operations.

In testimony whereof I have signed my name to this specification in the presence of two subscribing witnesses.

HENRY FRANKLIN McLEY.

Witnesses:
CLAUDE E. YARBROUGH,
FRANCIS L. READ.